US012308187B2

(12) United States Patent
Manev et al.

(10) Patent No.: US 12,308,187 B2
(45) Date of Patent: May 20, 2025

(54) SYSTEM FOR CONTROLLING A VACUUM INTERRUPTER FOR A POWER DIVERTER SWITCH, A POWER DIVERTER SWITCH AND AN ON-LOAD TAP CHANGER

(71) Applicant: Hitachi Energy Ltd, Zürich (CH)

(72) Inventors: Georgi Manev, Sofia (BG); Todor Kokev, Sofia (BG); Borislav Vasilev, Sofia (BG)

(73) Assignee: Hitachi Energy Ltd, Zürich (CH)

(*) Notice: Subject to any disclaimer, the term of this patent is extended or adjusted under 35 U.S.C. 154(b) by 161 days.

(21) Appl. No.: 18/022,218

(22) PCT Filed: May 6, 2021

(86) PCT No.: PCT/EP2021/062047
§ 371 (c)(1),
(2) Date: Feb. 20, 2023

(87) PCT Pub. No.: WO2022/089784
PCT Pub. Date: May 5, 2022

(65) Prior Publication Data

US 2023/0317389 A1 Oct. 5, 2023

(30) Foreign Application Priority Data

Oct. 26, 2020 (EP) .................................... 20203856

(51) Int. Cl.
*H01H 33/666* (2006.01)
*H01H 9/00* (2006.01)

(52) U.S. Cl.
CPC ........ *H01H 33/666* (2013.01); *H01H 9/0027* (2013.01); *H01H 9/0038* (2013.01); *H01H 2033/6667* (2013.01)

(58) Field of Classification Search
CPC .. H01H 9/0027; H01H 9/0038; H01H 9/0005; H01H 9/0016; H01H 9/0044;
(Continued)

(56) References Cited

U.S. PATENT DOCUMENTS

| | | | | |
|---|---|---|---|---|
| 4,978,815 A * | 12/1990 | Berger | ................. | H01H 9/0038 218/120 |
| 5,191,179 A * | 3/1993 | Yatchum | .............. | H01H 9/0027 200/18 |

(Continued)

FOREIGN PATENT DOCUMENTS

| | | |
|---|---|---|
| CN | 201359912 Y | 12/2009 |
| CN | 102460623 A | 5/2012 |

(Continued)

OTHER PUBLICATIONS

Translation of JPH 0963868 (Original document published Mar. 7, 1997) (Year: 1997).*

(Continued)

*Primary Examiner* — William A Bolton
(74) *Attorney, Agent, or Firm* — Sage Patent Group

(57) ABSTRACT

A system for controlling a vacuum interrupter for a power diverter switch comprises a main driving shaft which is configured to drive the control cam. The system further comprises the vacuum interrupter which is configured to separate electrical contacts in a vacuum by use of a contact rod, and a transmission unit which is configured to transmit the force generated by the main driving shaft to the contact rod. The transmission unit comprises a lever mechanism with a plurality of rollable guiding elements and a rotatable fork-shaped lever, the lever mechanism is coupled to both the control cam and the contact rod of the vacuum interrupter such that a rotation of the control cam generated by the main driving shaft causes a movement of the contact rod (Continued)

due to a guided rotation of the fork-shaped lever by means of rolling of the guiding elements.

20 Claims, 3 Drawing Sheets

(58) Field of Classification Search
CPC .. H01H 9/0072; H01H 2033/667; H01H 3/42; H01F 29/04
USPC ... 218/140, 10, 12, 118, 134, 139, 153, 154; 200/11 TC, 33 B, 416
See application file for complete search history.

(56) References Cited

U.S. PATENT DOCUMENTS

| | | | | |
|---|---|---|---|---|
| 6,060,669 | A * | 5/2000 | Dohnal | H01H 9/0033 200/11 TC |
| 9,401,249 | B2 * | 7/2016 | Elick | H01H 9/0044 |
| 10,460,884 | B2 * | 10/2019 | Pankofer | H01F 29/04 |
| 10,692,664 | B2 * | 6/2020 | Zerr | H01F 29/04 |
| 2012/0139510 | A1 | 6/2012 | Wrede | |
| 2014/0159847 | A1 * | 6/2014 | Wrede | H02P 13/06 336/150 |

FOREIGN PATENT DOCUMENTS

| | | | | |
|---|---|---|---|---|
| CN | 204407244 | U | 6/2015 | |
| CN | 110189937 | A | 8/2019 | |
| EP | 2261935 | A1 | 12/2010 | |
| JP | H0963868 | * | 3/1997 | H01H 9/0038 |
| JP | 2004039958 | A | 2/2004 | |
| JP | 200439958 | * | 5/2004 | H01F 29/04 |

OTHER PUBLICATIONS

International Search Report and Written Opinion of the International Searching Authority, PCT/EP2021/062047, mailed Jul. 13, 2021, 12 pages.
Notification to Grant Patent Right for Invention for Chinese Patent Application No. 202180055155.3, mailed Aug. 25, 2023, 7 pages.
Office Action for Brazilian Patent Application No. BR112023003748-4, mailed Nov. 12, 2024, 9 pages.

* cited by examiner

SYSTEM FOR CONTROLLING A VACUUM INTERRUPTER FOR A POWER DIVERTER SWITCH, A POWER DIVERTER SWITCH AND AN ON-LOAD TAP CHANGER

CROSS REFERENCE TO RELATED APPLICATIONS

This application is a 35 U.S.C. § 371 national stage application of PCT International Application No. PCT/EP2021/062047 filed on May 6, 2021, which in turn claims priority to European Patent Application No. 20203856.8, filed on Oct. 26, 2020, the disclosures and content of which are incorporated by reference herein in their entireties.

TECHNICAL FIELD

The present disclosure is related to a system for controlling a vacuum interrupter for a power diverter switch. The present disclosure is further related to a corresponding power diverter switch and an on-load tap changer.

BACKGROUND

Vacuum interrupters are widely used in utility power transmission systems, power generation units and power-distribution systems for railways, for example. Therein, the vacuum interrupter realizes a switch of a medium-voltage circuit-breaker, generator circuit-breaker, or high-voltage circuit-breaker which uses electrical contacts in a vacuum to reliably separate the electrical contacts resulting in a metal vapour arc, which is quickly extinguished.

Document JP 2004039958 A discloses a vacuum valve on-load tap changer which is intended to miniaturize by a compact change-over switch and a cam mechanism for driving the change-over switch. The vacuum valve Ma-Mc comprises a change-over switch SW which is disposed in parallel along a plane perpendicular to an axial line of a drive axis 3. First to third driven rollers 7a to 7c abut on a cam surface 601 of a drive cam 6 attached to a drive axis.

Document CN 201359912 Y discloses a lever drive mechanism of a vacuum tube which comprises a moulded plastic bottom plate on which a vacuum tube is mounted through a connection rod device. The lever drive mechanism further comprises a lever, a connection rod, a bearing, and a reset spring, wherein the connection rod is connected with a lower linkage of the vacuum tube through thread. The lever is hinged with the bearing.

Document US 2012/139510 A1 discloses a stepping switch comprising vacuum switching tubes. One or more cam disks are provided which have profiled circumferential contours both on the upper or lower face as well as on the lateral face, said contours being in the shape of cams for example, so that the vacuum switching tubes can be actuated by both the profiled circumferential contour of the lateral face as well as by the contour of the upper or lower face.

Document CN 204407244 U discloses a combined type cam disc for controlling a vacuum tube group. The combined type cam disc is characterized in that it includes an upper cam disc, a middle cam disc and a lower cam disc which rotate coaxially and are arranged at the upper part, middle part and lower part of the combined type cam disc. The upper cam disc, the middle cam disc and the lower cam disc respectively drive lever mechanisms in three vacuum tubes in each phase to act, so that the three vacuum tubes in each phase can be driven to act.

In this respect, it is a challenge to provide stable and reliable mechanisms to transmit the motion from a driving cam to a contact rod of the vacuum interrupter to securely switch the electrical contacts.

SUMMARY

It is an object to provide a system for controlling a vacuum interrupter for a power diverter switch that enables secure and reliable switching of electrical contacts of the vacuum interrupter. It is a further object to provide a corresponding power diverter switch and an on-load tap changer including such a system.

These objects are achieved by the subject-matter of the independent claim. Further developments and embodiments are described in the dependent claims.

According to an embodiment, a system for controlling a vacuum interrupter for a power diverter switch comprises a main driving shaft which is coupled to a control cam and which is configured to drive the control cam. The system further comprises the vacuum interrupter which is configured to separate electrical contacts in a vacuum by use of a contact rod, and a transmission unit which is configured to transmit the force generated by the main driving shaft to the contact rod. The transmission unit comprises a lever mechanism with a plurality of rollable guiding elements and a rotatable fork-shaped lever. The guiding elements are in contact with the fork-shaped lever and each are configured to be rollable around a respective axis of rotation that is perpendicular to a longitudinal center axis of the vacuum interrupter. The lever mechanism is coupled to both the control cam and the contact rod of the vacuum interrupter such that a rotation of the control cam generated by the main driving shaft causes a movement of the contact rod due to a guided rotation of the fork-shaped lever by means of rolling of the guiding elements.

By use of the described system a compact and simple design of mechanism for control of a vacuum interrupter (VI) in a diverter switch of an on-load tap-changer is feasible. Due to the rollable guiding elements and the fork-shaped lever the system enables a reliably directed movement of the contact rod and thus a secure separation of the electrical contacts of the VI. Moreover, the described system even allows misalignment of the VI to certain degree.

It is a recognition of the present disclosure that usual designs for control of a VI, used in diverter switches include various types of sliding guiders and auxiliary levers with hinges, which are driven by means of a cam. Such mechanisms are used to transmit the motion from the cam to the contact rod of the VI. Guidance is provided by bushing elements. In most cases, it is difficult to ensure alignment of such bushings with acceptable tolerances because there are several details between the VI's carrier and the bushings. In addition, the sliding friction that occurs in sleeve elements and in other hinge elements leads to potential problems such as wear, significant changes in the coefficient of friction in case of temperature changes, and in changes in the viscosity of the oil.

The described system enables counteracting the aforementioned effects and contributes to a space-saving design of a mechanism with a clear structure and a small number of elements. The system provides a beneficial guidance to the VI's contact rod to enable a directed movement of the contact rod and secure and reliable separation of the electrical contacts of the VI. The guidance provided by the rollable guiding elements is realized in the design of the diverter switch and is aligned with the longitudinal or center axis of the VI. The rollable guiding elements contributes to reduce loss due to sliding friction. For example, the plurality of rollable guiding elements includes guiding elements formed as rolling bearings, rolls and/or bushings. Thus, there is rolling friction instead of sliding-friction in the described system.

Moreover, due to the clear structure the described system contributes to reduce the requirements regarding the tolerance margins of the interacting components and thus enables an economically advantageous manufacturing and assembling.

According to an embodiment of the system, the fork-shaped lever is rotatable with respect to a rotation axis of an axle which is orientated perpendicularly to a center axis of the vacuum interrupter. Moreover, the lever mechanism comprises two guiding units each comprising at least one inner guiding element with respect to the center axis of the vacuum interrupter arranged to guide a rotation of the fork-shaped lever around its rotation axis. Such a configuration realizes one possibility to enable a securely guided rotation of the fork-shaped lever causing a reliable movement of the contact rod of the VI.

According to a further embodiment of the system, the aforementioned two guiding units each further comprises an outer guiding element, a guiding pin and a limiter. The respective outer guiding element is arranged between the inner guiding element and the guiding pin with respect to the center axis of the vacuum interrupter and is further limited by the limiter to guide a rotation of the fork-shaped lever along the center axis of the vacuum interrupter. Such a configuration of the guiding units contributes to a precise guidance of the guided components and to prevent unwanted rotation around the center axis of the VI.

According to a further embodiment of the system, the fork-shaped lever is formed as an L-shaped bilateral fork comprising four protrusions facing the center axis of the vacuum interrupter. The four protrusions can be divided into two upper and two lower protrusions with respect to the center axis of the vacuum interrupter. A respective guiding element is arranged between a respective upper and lower protrusion of the bilateral fork at an opposite side to another with respect to the center axis of the vacuum interrupter. Such a configuration also contributes to a beneficially directed transmission of force between the interacting components and thus enables a reliably guided rotation of the fork-shaped lever driving the movement of the contact rod of the VI.

According to a further embodiment of the system, the lever mechanism comprises a bushing which is configured to interact with the fork-shaped lever, a bushing nut which is configured to limit a position of the bushing, and a stud which is connected to the contact rod of the VI. The bushing, the bushing nut and the stud all are arranged along the center axis of the vacuum interrupter. Further, the bushing is configured as a sleeve arranged between the contact rod and the bushing nut with respect to the center axis of the vacuum interrupter, and the stud is arranged inside the bushing such that a predetermined gap between the bushing and the stud is formed enabling rotation of the bushing around the center axis of the vacuum interrupter. Such a specific configuration of the lever mechanism allows for simple assembling and aligning of the interacting components. The gap between the bushing and the stud enables to compensate an error or misalignment between the longitudinal axis of the VI and the driving mechanism of the main driving shaft.

Moreover, the aforementioned components can be assembled such that there is a further predetermined gap between the bushing and the bushing nut arranged below the bushing. The further predetermined gap may have a value of 0.02-0.05 mm After adjustment of this further gap, the bushing nut can be fixed by means of a pin, for example. The bushing can be rotated freely and can be used for adjustment of a contact gap of the VI. For example, the bushing comprises an external thread at an outer surface to further contribute to a simple and precise assembling and alignment of the lever mechanism, the transmission unit and the system.

According to a further embodiment of the system, the lever mechanism further comprises fixing means configured to secure a predetermined position of the bushing. Thus, the aligned position of the bushing 14 can be secured against self-untightening by means of a screw and a special limiter, for example.

According to an embodiment, a power diverter switch for an on-load tap changer comprises an insulating plate, a supporting plate, and an embodiment of the described system, which is coupled to both the insulating plate and the supporting plate, in between for example. Such a configuration indicates an exemplary possibility to arrange the system inside a power diverter switch. However, there are also alternative possibilities to arrange the system. For instances, the system can also be arranged outside the insulating plate and/or the supporting plate. The power diverter switch for an on-load tap changer still comprises an insulating plate, a supporting plate and an embodiment of the described system, respectively.

According to an embodiment, an on-load tap changer for setting a gear ratio comprises an embodiment of the aforementioned power diverter switch.

Such a configuration of a power diverter switch and an on-load tap changer using an embodiment of the described system for controlling a VI enables secure and reliable switching or separation of electrical contacts of the VI. As a result of that the power diverter switch and the on-load tap changer comprises an embodiment of the system as described above, described features and characteristics of the system are also disclosed with respect to the power diverter switch and the on-load tap changer and vice versa.

The described system and the corresponding power diverter switch and on-load tap changer include a compact and simple design of a hinge mechanism for control of vacuum interrupters with leading of the contact rod by means of rollable guiding elements and allowing misalignment regarding the position of VI. The driving mechanism provided by the described system combines three functions:

1. Transmits movement from the control cam to the VI's contact rod, providing precise guidance (by rolling friction) along its longitudinal axis.
2. Allows lateral displacement of the axis of the VI relative to the axis of the driving mechanism, whereby the parallelism of the two axes is maintained.
3. Ensures the ability to adjust the contact gap of the VI while providing reliable protection against self-untightening and the possibility of easy re-adjustment if necessary.

The system is suitable when a control cam combined with a hinge driving mechanism is used, in particular. It is also suitable in cases where the dimensional chain for the parts involved in the actuation of the cam is complex and compensation of accumulated errors is needed. Furthermore, the system provides an easy setup and maintenance. Due to rolling friction of the guiding elements, the influence of temperature changes and wearing is reduced as well.

Identical reference numbers designate elements or components with identical functions. In so far as elements or components correspond to one another in terms of their function in different figures, the description thereof is not repeated for each of the following figures. For the sake of clarity elements might not appear with corresponding reference symbols in all figures possibly.

DETAILED DESCRIPTION

Figure 1:
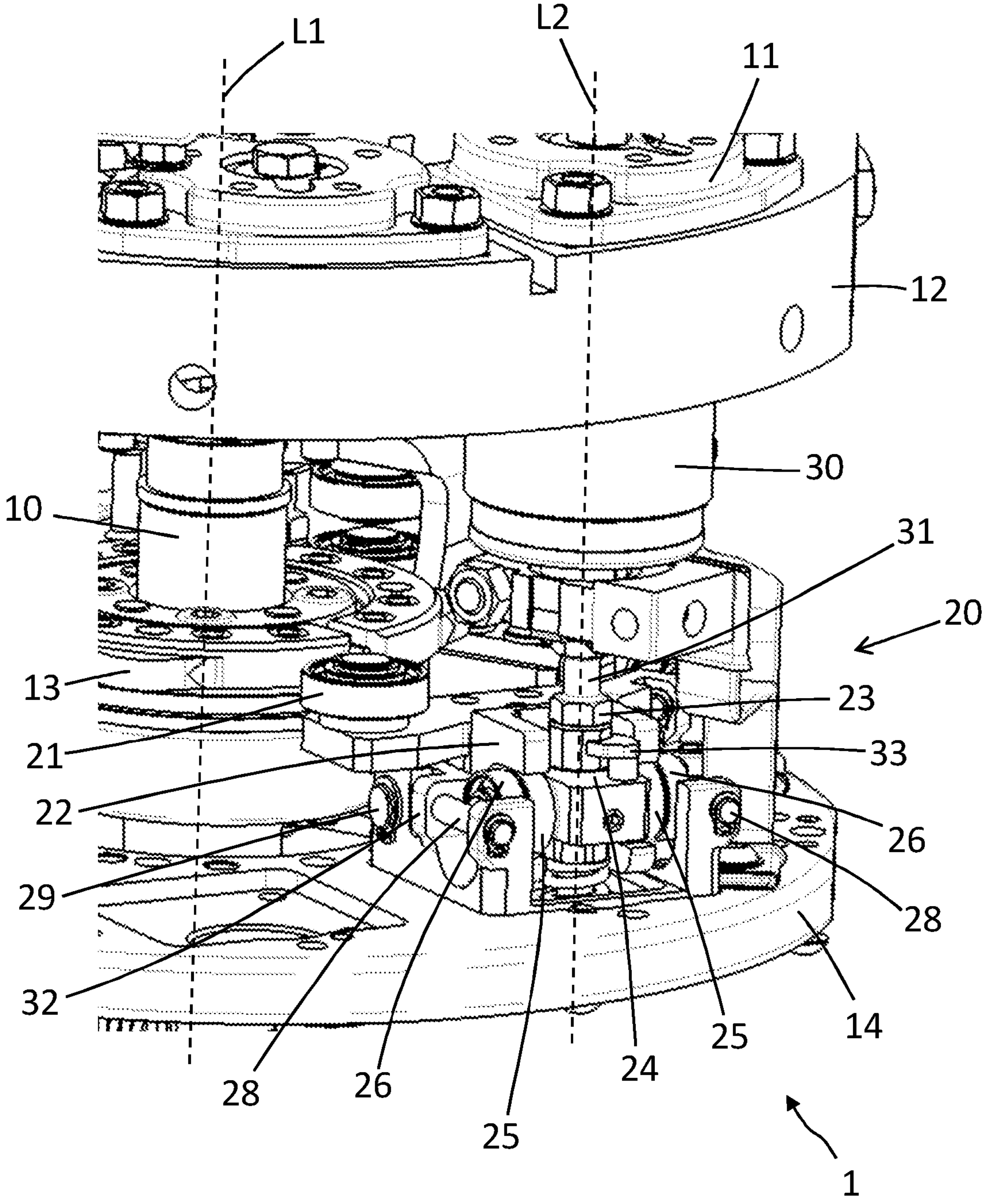
FIG. 1 is an exemplary embodiment of a system for controlling a vacuum interrupter for a power diverter switch in a perspective view.
Figure 2:
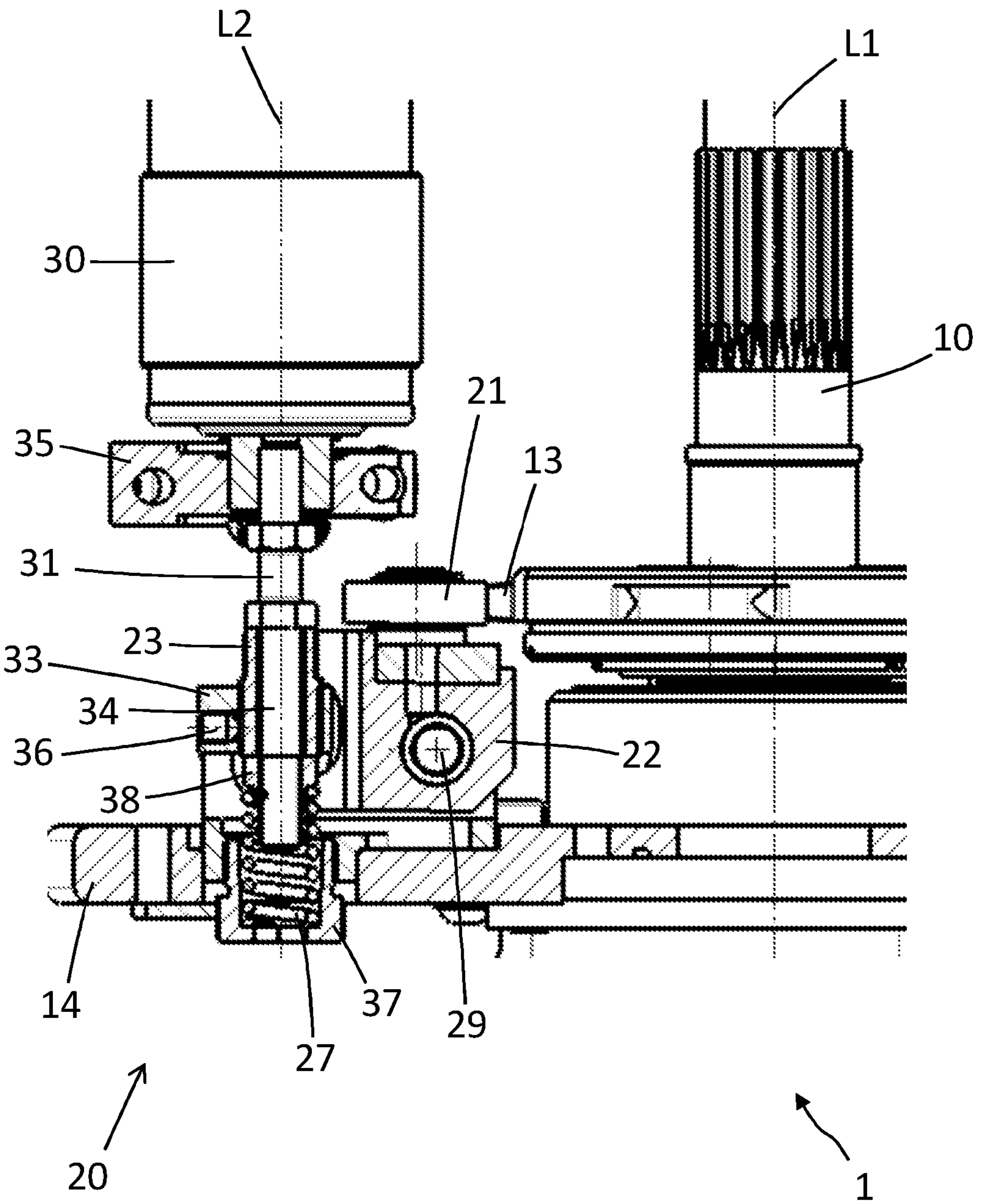
FIG. 2 is a side view of the system of FIG. 1 illustrating a partial cross section view.
Figure 3:
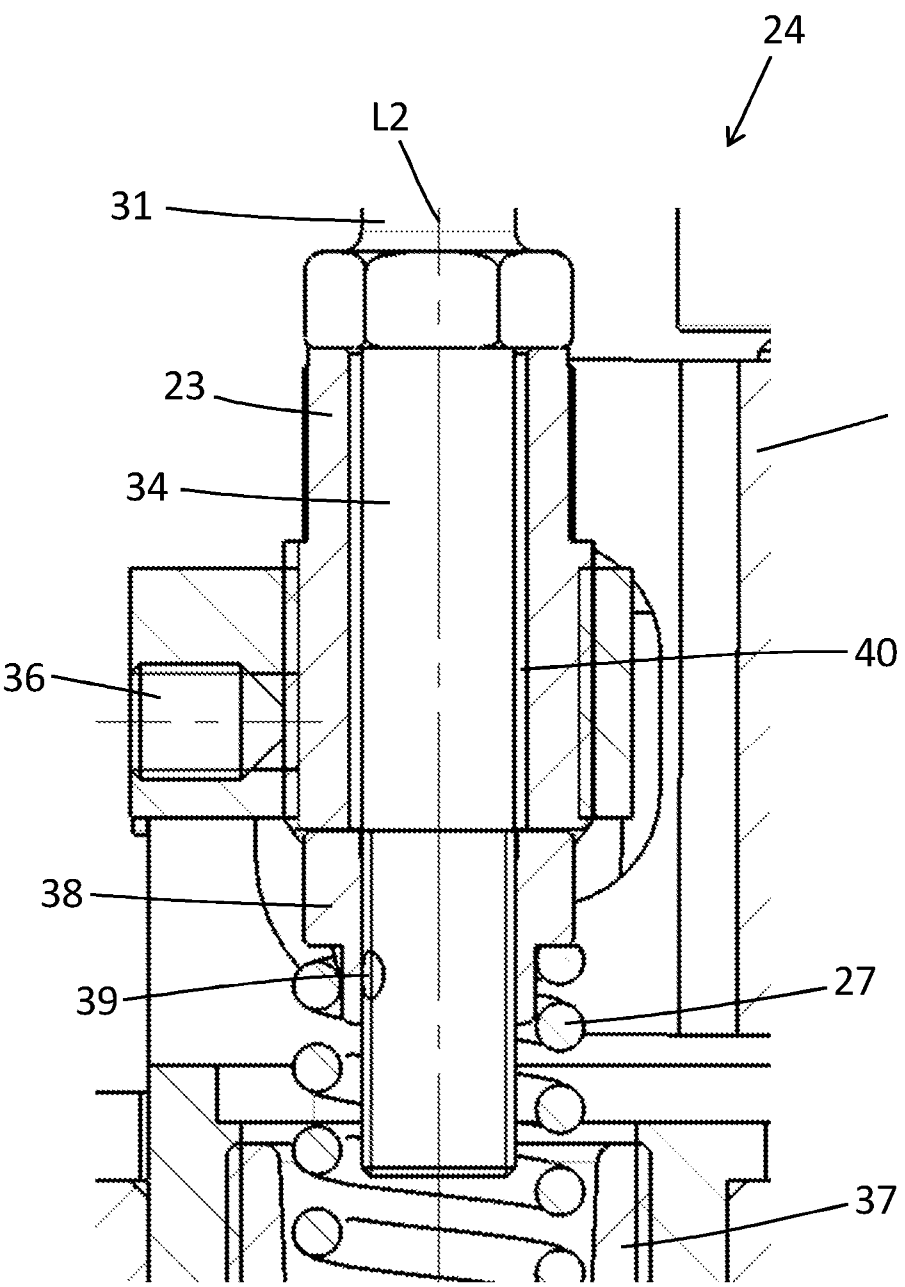
FIG. 3 is a detailed view of components according to the system of FIGS. 1 and 2 in cross section view.

FIG. 1 illustrates a perspective view of an embodiment of a system 1 for controlling a vacuum interrupter 30 of a power diverter switch. FIG. 2 illustrates in a side view a partial cross section of the system 1. FIG. 3 shows an enlarged cross section side view of components of the system 1.

The system 1 includes a main driving shaft 10 which is coupled to a control cam 13 and which is configured to drive the control cam 13. The vacuum interrupter (VI) 30 which is configured to separate electrical contacts in a vacuum by use of a contact rod 31. A transmission unit 20 which is configured to transmit the force generated by the main driving shaft 10 to the contact rod 31. The transmission unit 20 comprises a lever mechanism including a plurality of rollable guiding elements and a fork-shaped lever 22 which is coupled to both the control cam 13 and the contact rod 31 of the VI 30. The guiding elements are formed as rolling bearings 25, 26. Thus, a rotation of the control cam 13 generated by the main driving shaft 10 causes a movement of the contact rod 31 due to a guided rotation of the fork-shaped lever 22 by means of rolling of the bearings 25, 26.

The system 1 realizes a component of a power diverter switch for an on-load tap changer. The diverter switch further comprises a lower supporting steel plate 14 and an upper insulating plate 12 on which is mounted a stationary contact board 11, carrying the VI 30. The control cam 13 is fastened to the main driving shaft 10.

The lever mechanism of the transmission unit 20 comprises a special guiding element 24 interacting with the fork-shaped lever 22. The contact rod 31 of the VI 30 is guided straight by means of the lever mechanism and the transmission unit 20. The transmission unit 20 comprises two groups of two rolling bearings including the bearings 25 and 26, arranged on an axis perpendicular to a longitudinal or center axis L2 of the VI 30.

The outer pair of rolling bearings 26 are arranged bilaterally on both sides with respect to the center axis L2 of the VI 30. The outer pair of bearings 26 provides guidance of the lever mechanism along the center axis L2 of the VI 30 by means of grooves or gaps predetermined arranged between the bearing 26 and corresponding bearing limiter 32 adjacent to an outer surface of the bearings 26. These predefined grooves or gaps further contributes to prevent an unwanted rotation of the lever mechanism around the center axis L2 of the VI 30 as well.

Guiding pins 28 that can be arranged with rolls are used as lateral restraints next to an outer side of the bearings 26 with respect to the center axis L2 of the VI 30, respectively.

The guiding element 24 is driven by the L-fork-shaped lever 22 which is rotatable around on a fixed axle 29 and mounted on roller bearings. At one end, the lever 22 is shaped like a bilateral fork, which contacts with the inner pair of bearings 25 of the guiding element 24, thus transmitting the movement of the contact rod 31 of the VI 30. At the other end of the lever 22 there is a lever bearing 21 which is driven directly by the control cam 13.

The guided element 24 has a central threaded hole that coincides with the center axis L2 of the contact rod 31 and the VI 30 at its nominal position. In this hole is mounted a bushing 23 with external thread (see FIGS. 2 and 3). The bushing 23 is formed as a sleeve and inside the bushing 23 there is a stud 34 displaced, which is connected to the contact rod 31 of the VI 30. The stud 34 is used for fixing a current carrying plate 35 as well. The bushing 23 is limited by a hexagonal shaped support of the stud 34 above and a special bushing nut 38 below with respect to the center axis L2. A small, predetermined gap of approximately 0.02-0.05 mm is realized between the bushing 23 and the bushing nut 38. After adjustment of this gap, the bushing nut 38 can be fixed by means of a pin 39, for example. In this way the thread bushing 23 can be rotated freely around the center axis L2 and can be used for precise adjustment of a contact gap of the VI 30. The contact gap is located inside the vacuum interrupter 30 relating to two contact plates. When the VI 30 is opened these plates are separated on a specific distance and the current flow is disconnected. This distance is defined by the manufacturer of the VI 30 and should be in a tolerance frame. The bushing 23 can be secured against self-untightening by fixing means of a screw 36 and a special bushing limiter 33.

The bushing 23 and the stud 34 inside are arranged such that there is a further gap 40 between the bushing 23 and the stud 34, which allows to compensate manufacturing and/or alignment errors between the longitudinal center axis L2 of the VI 30 and a longitudinal center axis L1 of the main driving shaft 10.

Moreover, a contact spring 27 and corresponding adjusting spring nut 37 are arranged below the bushing 23 and the bushing nut 38 to provide a biased configuration with respect to the contact rod 31. Alternatively, in order to contribute to a space-saving design of the system 1 two contact springs could be placed on both sides with respect to the center axis L2. These contact springs could be driven by the contact rod 31 using a common strap.

The described system 1 provides a reliable mechanism for direct control of the vacuum interrupter 30 in the power diverter switch for an on-load tap changer. The structure of the system 1 is clear and enables a simple driving mechanism for the VI 30. Due to the rollable guiding elements 25, 26 and the fork-shaped lever 22 the system 1 enables a reliably directed movement of the contact rod 31 and thus a secure separation of the electrical contacts of the VI 30. Moreover, the described system 1 even allows misalignment of the VI 30 to certain degree.

REFERENCE NUMERALS

1 system for controlling a vacuum interrupter
10 main driving shaft 11 stationary contact board
12 insulating plate
13 control cam
14 supporting plate
20 transmission unit
21 lever bearing
22 fork-shaped lever
23 bushing with external thread
24 guiding element
25 inner rolling bearing
26 outer rolling bearing
27 contact spring
28 guiding pin
29 axle
30 vacuum interrupter
31 contact rod
32 bearing limiter
33 bushing limiter
34 stud
35 current carrying plate
36 screw
37 spring nut
38 bushing nut
39 fixing pin
40 gap
L1 longitudinal axis of the main driving shaft
L2 longitudinal axis of the cylindrical element/vacuum interrupter

The invention claimed is:

1. A system for controlling a vacuum interrupter for a power diverter switch, comprising:

a main driving shaft which is coupled to a control cam and which is configured to drive the control cam, the vacuum interrupter which is configured to separate electrical contacts in a vacuum by use of a contact rod, and a transmission unit which is configured to transmit a force generated by the main driving shaft to the contact rod, wherein the transmission unit comprises a lever mechanism with a plurality of rollable guiding elements and a rotatable fork-shaped lever, the guiding elements are in contact with the fork-shaped lever and each are configured to be rollable around a respective axis of rotation that is perpendicular to a longitudinal center axis of the vacuum interrupter, the lever mechanism is coupled to both the control cam and the contact rod of the vacuum interrupter such that a rotation of the control cam generated by the main driving shaft causes a movement of the contact rod due to a guided rotation of the fork-shaped lever in response to rolling of the guiding elements.

2. The system according to claim 1, wherein the plurality of rollable guiding elements includes guiding elements formed as rolling bearings, rolls and/or bushings.

3. The system according to claim 1, wherein the fork-shaped lever is rotatable with respect to a rotation axis of an axle perpendicular to the center axis of the vacuum interrupter and wherein the lever mechanism comprises two guiding units each comprising at least one inner guiding element with respect to the center axis of the vacuum interrupter arranged to guide the rotation of the fork-shaped lever around the rotation axis of the at least one inner guiding element.

4. The system according to claim 3, wherein each of the two guiding units each further comprises a respective outer guiding element, a guiding pin and a limiter, wherein each respective outer guiding element is arranged between the inner guiding element and the guiding pin with respect to the center axis of the vacuum interrupter further limited by the limiter to guide the rotation of the fork-shaped lever along the center axis of the vacuum interrupter.

5. The system according to claim 1, wherein the fork-shaped lever is formed as an L-shaped bilateral fork comprising four protrusions facing the center axis of the vacuum interrupter, wherein a respective guiding element is arranged between two protrusions of the bilateral fork with respect to the center axis of the vacuum interrupter.

6. The system according to claim 1, wherein the lever mechanism comprises:

a bushing configured to interact with the fork-shaped lever;

a bushing nut configured to limit a position of the bushing; and a stud connected to the contact rod, wherein the bushing, the bushing nut and the stud are arranged along the center axis of the vacuum interrupter, wherein the bushing is arranged between the contact rod and the bushing nut with respect to the center axis of the vacuum interrupter, and wherein the stud is arranged inside the bushing such that a predetermined gap between the bushing and the stud is formed enabling rotation of the bushing around the center axis of the vacuum interrupter.

7. The system according to claim 6, wherein the lever mechanism further comprises a fastener configured to secure a predetermined position of the bushing.

8. A power diverter switch for an on-load tap changer, comprising:

an insulating plate;

a supporting plate; and a system coupled to both the insulating plate and the supporting plate, the system comprising:

a main driving shaft which is coupled to a control cam and which is configured to drive the control cam;

a vacuum interrupter which is configured to separate electrical contacts in a vacuum by use of a contact rod; and a transmission unit which is configured to transmit a force generated by the main driving shaft to the contact rod, wherein the transmission unit comprises a lever mechanism with a plurality of rollable guiding elements and a rotatable fork-shaped lever, the guiding elements are in contact with the fork-shaped lever and each are configured to be rollable around a respective axis of rotation that is perpendicular to a longitudinal center axis of the vacuum interrupter, the lever mechanism is coupled to both the control cam and the contact rod of the vacuum interrupter such that a rotation of the control cam generated by the main driving shaft causes a movement of the contact rod due to a guided rotation of the fork-shaped lever in response to rolling of the guiding elements.

9. The power diverter switch of claim 8, wherein the plurality of rollable guiding elements includes guiding elements formed as rolling bearings, rolls and/or bushings.

10. The power diverter switch of claim 8, wherein the fork-shaped lever is rotatable with respect to a rotation axis of an axle perpendicular to the center axis of the vacuum interrupter and wherein the lever mechanism comprises two guiding units each comprising at least one inner guiding element with respect to the center axis of the vacuum interrupter arranged to guide the rotation of the fork-shaped lever around the rotation axis of the at least one inner guiding element.

11. The power diverter switch of claim 10, wherein each of the two guiding units each further comprises a respective outer guiding element, a guiding pin and a limiter, wherein each respective outer guiding element is arranged between the inner guiding element and the guiding pin with respect to the center axis of the vacuum interrupter further limited by the limiter to guide the rotation of the fork-shaped lever along the center axis of the vacuum interrupter.

12. The power diverter switch of claim 8, wherein the fork-shaped lever is formed as an L-shaped bilateral fork comprising four protrusions facing the center axis of the vacuum interrupter, wherein a respective guiding element is arranged between two protrusions of the bilateral fork with respect to the center axis of the vacuum interrupter.

13. The power diverter switch of claim 8, wherein the lever mechanism comprises:

a bushing configured to interact with the fork-shaped lever;

a bushing nut configured to limit a position of the bushing; and a stud connected to the contact rod, wherein the bushing, the bushing nut and the stud are arranged along the center axis of the vacuum interrupter, wherein the bushing is arranged between the contact rod and the bushing nut with respect to the center axis of the vacuum interrupter, and wherein the stud is arranged inside the bushing such that a predetermined gap between the bushing and the stud is formed enabling rotation of the bushing around the center axis of the vacuum interrupter.

14. The power diverter switch of claim 13, wherein the lever mechanism further comprises a fastener configured to secure a predetermined position of the bushing.

15. An on-load tap changer for setting a gear ratio, comprising:

a power diverter switch comprising:

an insulating plate;

a supporting plate; and a system coupled to both the insulating plate and the supporting plate, the system comprising:

a main driving shaft which is coupled to a control cam and which is configured to drive the control cam;

a vacuum interrupter which is configured to separate electrical contacts in a vacuum by use of a contact rod; and a transmission unit which is configured to transmit a force generated by the main driving shaft to the contact rod, wherein the transmission unit comprises a lever mechanism with a plurality of rollable guiding elements and a rotatable fork-shaped lever, the guiding elements are in contact with the fork-shaped lever and each are configured to be rollable around a respective axis of rotation that is perpendicular to a longitudinal center axis of the vacuum interrupter, the lever mechanism is coupled to both the control cam and the contact rod of the vacuum interrupter such that a rotation of the control cam generated by the main driving shaft causes a movement of the contact rod due to a guided rotation of the fork-shaped lever in response to rolling of the guiding elements.

16. The on-load tap changer of claim 15, wherein the plurality of rollable guiding elements includes guiding elements formed as rolling bearings, rolls and/or bushings.

17. The on-load tap changer of claim 15, wherein the fork-shaped lever is rotatable with respect to a rotation axis of an axle perpendicular to the center axis of the vacuum interrupter and wherein the lever mechanism comprises two guiding units each comprising at least one inner guiding element with respect to the center axis of the vacuum interrupter arranged to guide the rotation of the fork-shaped lever around the rotation axis of the at least one inner guiding element.

18. The on-load tap changer of claim 17, wherein each of the two guiding units each further comprises a respective outer guiding element, a guiding pin and a limiter, wherein each respective outer guiding element is arranged between the inner guiding element and the guiding pin with respect to the center axis of the vacuum interrupter further limited by the limiter to guide a rotation of the fork-shaped lever along the center axis of the vacuum interrupter.

19. The on-load tap changer of claim 15, wherein the fork-shaped lever is formed as an L-shaped bilateral fork comprising four protrusions facing the center axis of the vacuum interrupter, wherein a respective guiding element is arranged between two protrusions of the bilateral fork with respect to the center axis of the vacuum interrupter.

20. The on-load tap changer of claim 15, wherein the lever mechanism comprises:

a bushing configured to interact with the fork-shaped lever;

a bushing nut configured to limit a position of the bushing; and a stud connected to the contact rod, wherein the bushing, the bushing nut and the stud are arranged along the center axis of the vacuum interrupter, wherein the bushing is arranged between the contact rod and the bushing nut with respect to the center axis of the vacuum interrupter, and wherein the stud is arranged inside the bushing such that a predetermined gap between the bushing and the stud is formed enabling rotation of the bushing around the center axis of the vacuum interrupter.

* * * * *